Jan. 29, 1924.　　　　　　　　　　　　　　　　　　1,481,818
G. ANDERSON
COMBINED SAW JOINTER AND GAUGE
Filed Feb. 2, 1922　　　　2 Sheets-Sheet 1
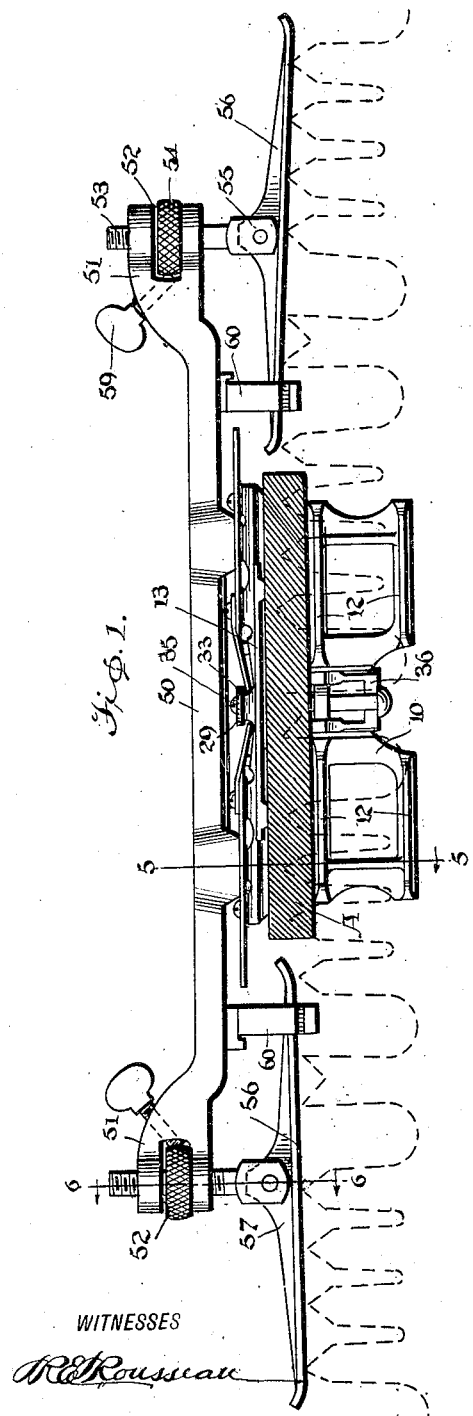
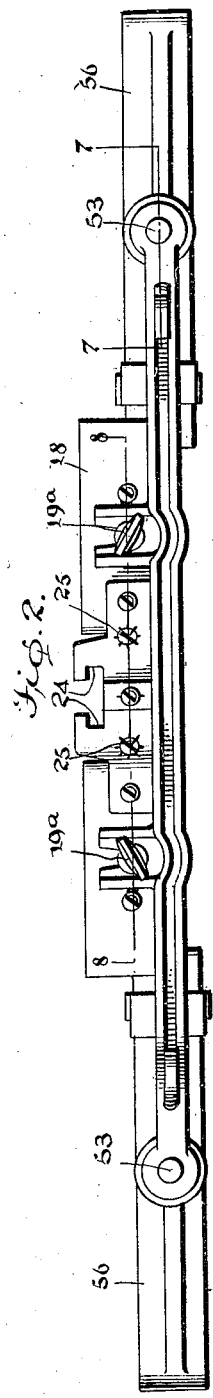
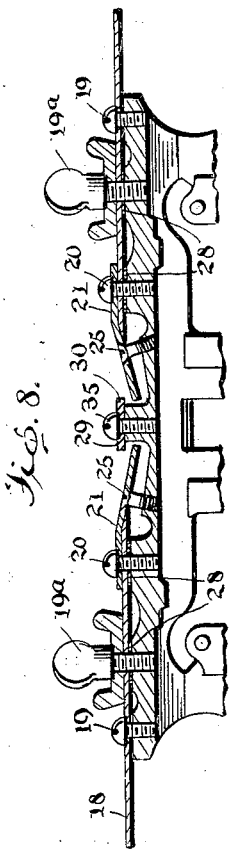
WITNESSES
R. E. Rousseau
INVENTOR
G. Anderson,
BY Munn & Co.
ATTORNEYS Jan. 29, 1924.
G. ANDERSON
1,481,818
COMBINED SAW JOINTER AND GAUGE
Filed Feb. 2, 1922    2 Sheets-Sheet 2
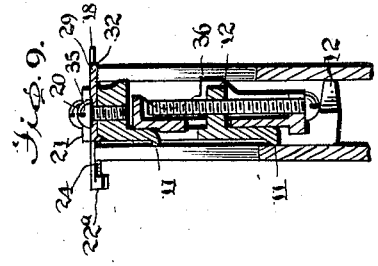
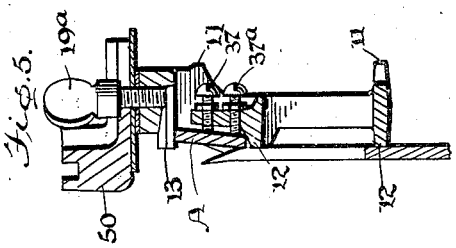
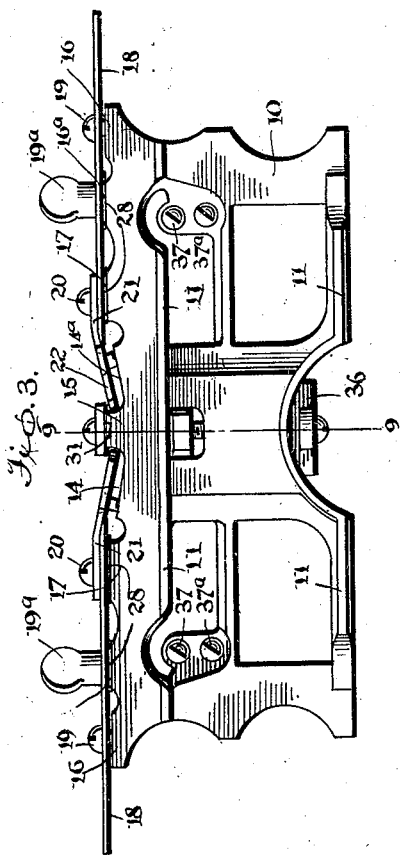
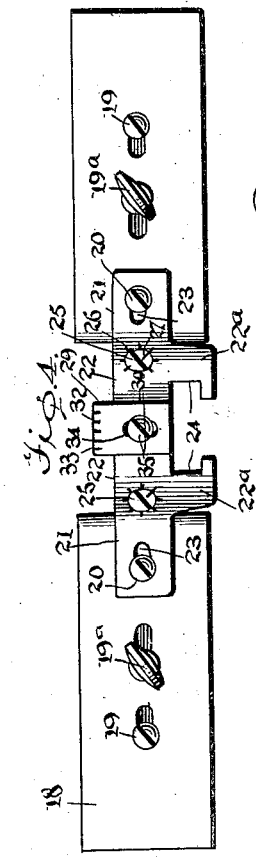
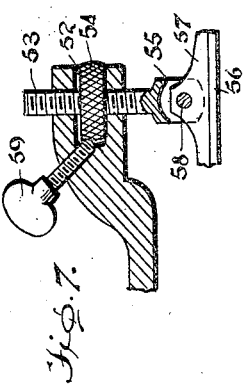
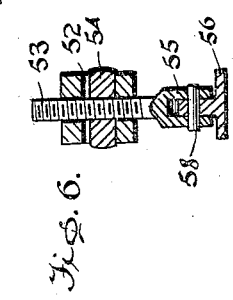
WITNESSES
INVENTOR
G. Anderson,
BY
ATTORNEYS Patented Jan. 29, 1924.

1,481,818

UNITED STATES PATENT OFFICE.

GUSTAF ANDERSON, OF ATLIN, BRITISH COLUMBIA, CANADA.

COMBINED SAW JOINTER AND GAUGE.

Application filed February 2, 1922. Serial No. 533,635.

*To all whom it may concern:*

Be it known that I, GUSTAF ANDERSON, a citizen of the United States, and a resident of Atlin, British Columbia, Dominion of Canada, have made certain new and useful Improvements in Combined Saw Jointers and Gauges, of which the following is a specification.

My present invention relates to saw fitting devices and to certain improvements in connection with patents previously granted to me, and more particularly to improvements in connection with saw fitting devices of the nature described and claimed in my pending application Serial No. 375,234, filed April 20, 1920.

The primary object of my present invention is to provide a tool of this character with a pair of resilient filing gauge members, each having a horizontal body portion and an inclined gaging portion, and so located, that a raker tooth swaging gauge member may be located for effective use between the filing gauge members without interfering therewith.

A further object is to provide accurate and convenient clamping and adjusting means properly located to prevent lateral yielding, or tilting, of the resilient filing gauge members, when a file is brought to bear thereon, at the time the raker teeth of a saw are being filed, so that the tooth points will have a true clearing-edge and will all be of a length corresponding with the adjusted position of the members.

A further object is to provide a raker tooth swaging gauge with a permanent gaging range equal to the various variations between the minimum and maximum adjustments required for different kinds of timber and suitable means for preventing accidental shifting of the gaging member.

A still further object is to provide a fully adjustable file bed, whereby the file in its flatwise position, for side dressing saws, may not only be adjusted with respect to its angle, but may also be adjusted laterally from the opposite side of the tool.

A still further object lies in the construction, whereby the runner plates of a saw jointer support can be adjusted either up or down by the manipulation of a single nut, and in the provision of means for locking the nut for holding the adjustment.

In the accompanying drawings, illustrating my present invention and forming a part of this specification, Figure 1 is a side elevation of the complete tool showing the file in its flatwise position, and portions of a saw in dotted lines, Figure 2 is a top plan view of the tool removed, Figure 3 is an elevation of the reverse side with the saw jointer support detached, Figure 4 is a top plan view of the main tool as shown in Figure 3, Figures 5 and 6 are vertical transverse sections taken respectively on the lines 5—5 and 6—6 of Figure 1, Figure 7 is a partial vertical longitudinal section through the jointer support taken on the line 7—7 of Figure 2, Figure 8 is a similar view through the upper portion of the main tool taken on the line 8—8 of Figure 2, Figure 9 is a vertical transverse section on the line 9—9 of Figure 3.

Referring now to these figures, and more particularly to Figures 1, 3, 4 and 8, it will be seen that the frame 10, closely resembles that of my pending application Serial No. 375,234 above referred to, having on its opposite sides longitudinal flanges 11 and 12 to form parallel saw engaging planes, and an additional flange 13, as an upward continuation of the saw engaging plane on one side of the frame, against which a file may be clamped from beneath the last mentioned flange.

The flange 13 is of considerable thickness and the top central portion of the flange has been partially cut away, to form two separate recesses 14 and 14$^a$ and a central boss 15 (see Figure 3) for a purpose to be described presently. The end portions of this flange are similarly cut away for the purpose of lightness and for reducing the area of top surface to be machined whereby a series of bosses 16, 16$^a$ and 17 are left to carry cap plates 18 similar to those in my application above referred to. All of the bosses, including the boss 15 are machined to form a straight top surface plane at right angles with the side planes of the frame 10.

The cap plates 18 are clamped to the bosses 16, 16$^a$ and 17 by screws 19, 19$^a$ and 20. The screw 19$^a$, intermediate the ends of each cap plate, is preferably a thumb screw as shown for the purpose of speedily attaching and detaching a saw jointer support to be described presently.

Upon a further inspection of these figures, it will be seen that a raker tooth filing gauge member 21 is carried by the inner end of each cap plate 18. These gaging members are each provided with a highly tempered inclined file guiding top surface upon a portion 22 thereof inclining into one of the aforesaid recesses 14 and 14ª at one side of the boss 15, and each member has a slot 23 in its body portion by which it is firmly clamped to the tool jointly with one of the cap plates by the screws 20. It is understood that the temper has been drawn from this body portion to permit the members being flexed sufficiently to meet the requirements, which all come within the range of from 0.015 to 0.025 or 0.030 of an inch; that is to say, a tool of this character may be permanently adjusted to cause the raker teeth to be a 1/64 of an inch shorter than the cutting teeth of a saw for hard wood, and the further reduction in the length of the raker teeth, up to the maximum variation of 0.025 of an inch, varies with the different kinds of timber and conditions, as well as with the idea of the person using the saw. Thus the variation between the minimum and maximum adjustments becomes the gaging range, which may be divided up, as the thickness of a layer of a certain number of sheets of tissue paper. These requirements are well known among users of cross cut saws and would not need to be described in detail, were it not that I desire to point out to manufacturers and to persons inexperienced in the use of cross cut saws, the necessity of rigidity and accuracy in tools of this kind, so as to enable them to fully appreciate the importance of my present improvements, particularly in connection with the elements pertaining to fitting the raker teeth of saws.

With reference to the filing gauge members 21 hereinbefore partially described, it will be seen upon a further inspection of Figure 4, that the filing surface portions 22 of the members have extensions 22ª projecting laterally beyond one side of the frame 10. Each of these extensions has a saw tooth receiving recess opening inwardly toward one another and a transverse tooth stop 24 at the terminal of the recess. Each filing member 21 also has an opening through its file guiding surface 22 and an adjusting screw 25 having threaded engagement with the flange 13 at right angles with the inclined portion of the filing gauge member 21. The openings in the filing surface portions are provided with countersunk recesses to receive the heads of the adjusting screws 25.

It is to be noted, that by reason of the filing gauge members 21 being firmly clamped to the cap plates 18 at a point close to the file guiding surface of the members 21, they become very rigid, and the raker teeth of a saw can therefore be filed down even with the top surface of the gaging members without fear of irregularity in the length of the tooth points, as the pressure of the file during the filing operation will not cause the gaging members to yield or tilt laterally.

I also provide graduated guide marks 26 directly on the filing surface 22 around the adjusting screws 25, and an indicator mark 27 sunk into the screw-heads to cooperate with the marks on the filing surface, as plainly seen in Figure 4. The marks on the filing surface are so located as to represent eighths and quarter turns of the screws.

It is to be noted that these guide marks 26 and 27 will permit a free and unobstructed passage of a file thereover, and the filing gauge members 21 being at all times kept at high tension will respond readily to the slightest turn of the adjusting screws 25, irrespective of whether the threads of these screws fit loose or tight in the frame. I therefore consider the graduated guide marks in their present form and location an important feature in connection with my present improvements for accurately determining the adjustment of the filing gauge members 21.

It is to be noted further, that these filing gauge members 21, are each tiltable over the inner end portion of each cap plate 18, into the respective recesses 14 and 14ª, by the manipulation of the two screws 20 and 25, so that the said gauge members may be fully adjusted irrespective of their flexibility. This tiltable feature, however, is not essential, unless the flexibility of the aforesaid gauge members should be insufficient to meet the requirement.

In reference to the minimum permanent adjustment of the gauge members hereinbefore referred to. The tooth stops 24 seen in Figure 4 are so located, and the inclined angle of these members being such (see Figure 3), as to leave the filing surface of each member at the point of the tooth stops approximately 0.015 of an inch below the line of the under surface of the cap plates 18 when the body of the members lies flat on the top surface thereof. Therefore, the flexing of these members may be limited to the range of variations required between the minimum and maximum adjustments only.

This slight requirement enables the body of the members being firmly clamped in position without fear of overtaxing their flexibility when they are being readjusted by the manipulation of the adjusting screws 25.

Referring now to the opposite side of the tool from that just described, I provide a narrow, flat gauge-plate member 29, see Figure 4, to serve as swage gauge while the raker teeth of saws are being swaged, and which is also adapted to cooperate with the filing gauges 21 for determining their correct adjustment. This gauge plate has a smooth under surface which forms the gaging surface, and is provided with hardened smooth anti-friction edges 30 cooperating with the filing gauges 21 for guiding the file transversely of the device. It has a downwardly depending lip 31 lying in a recess in one side of the boss 15 on the filing gauge side of the tool, (see Figure 3), to prevent rotative shifting of the plate member. The opposite end which forms the gaging end 32 of this gauge plate, projects laterally beyond the adjacent side plane of the tool a distance corresponding to the thickness of a saw, so that the raker teeth to be swaged are visible from the side. This end of the gauge plate has its top and edge marked with rule mark graduations 33 as shown, and in the present instance the plate is about 6/16 of an inch wide. It may of course be any width desired, but this width is preferable, as it provides a wide gaging surface and yet is not so wide as to simultaneously contact with the two points of a raker tooth, which would interfere with the tooth point that is being gaged. The gauge plate 29 has an oblong opening 34 as shown in Figure 4 to provide a limited horizontally transverse adjustment of the gaging portion projecting over the saw plane to correspond with the different thicknesses of saws, whereby the side view of the teeth points need not be obstructed from an operable viewpoint. A clamping screw 35 passes through the opening 34 in the gauge plate and into a threaded opening in the boss 15 for firmly clamping the gauge plate 29 to the boss.

The boss 15, having first been machined in a horizontal plane together with the bosses 16, 16ª and 17, as hereinbefore stated, is then machined a second time in a slightly inclined plane longitudinally of the device, one side of the boss being left in the same horizontal plane with the other bosses 16, 16ª and 17. The inclined angle of the boss 15 being such as to produce a vertical variation in the gaging surface of the gauge plate of 0.002 of an inch for every sixteenth of an inch the tool is moved longitudinally of a saw, so that the gauge plate which is 6/16 of an inch wide, will have a permanent gaging range of 0.012 of an inch, in addition to 0.015 inch produced by washers 28 between the cap plates 18 and the bosses 16ª and 17 on which each of the cap plates are mounted. Thus it will be understood that the gauge plate will have a permanent gaging range of 0.027 of an inch, which is thought to be enough for any ordinary requirement. It is of course understood that this range may be varied by inserting shims either beneath the cap plates or the gauge plate.

For the purpose of being able to speedily adjust the cap plates 18 with respect to curvature, to fit the saw, it will be seen in the several figures that no washers are being carried by the bosses 16, at the outer ends of the device. The resiliency of the plates holds the adjustment.

By reference to the file clamping means for the saw jointer and side file, it will be seen that I utilize a slide 36 identically the same as in my pending application above referred to, although I have added pairs of vertically spaced screws 37 and 37ª to the file bed, see Figures 3 and 5, so as to better regulate the position of the file for side dressing the saw teeth to even up their set.

With reference to the saw jointer support or attachment, the bar 50 may be of any suitable form and is provided with a head 51 at each end, having a horizontal longitudinal bifurcation 52 therein. A vertically disposed threaded bolt 53 passes through an opening in the head and a nut 54 is disposed on the bolt in the bifurcation 52 between the adjacent portions of the head 51. The bolt 53 has on its lower end a bifurcated head 55 and runner plates or shoes 56, adapted to slide on the teeth of the saw, see Figure 1. Centrally of each plate is an upwardly extending ear 57 having a horizontally transverse opening therein, and a rivet or bolt 58, passing through the bifurcations of the lower head 55 of bolt 53 and the opening in the runner ear forms a pivotal connection between the plate 56 and the lower end of the respective bolt 53. Thus by the manipulation of the nuts 54 the runner plates 56 may be adjusted either up or down. A thumb screw 59 having threaded engagement through each of the bar heads 51 is adapted to bear against the nut 54 at each end of the bar 50 for locking the adjustment.

It will thus be understood that the threads of the bolt 53 will not be damaged by the thumb screw 59 and the adjustment of the runner plate 56 can be more speedily accomplished.

The lugs 60 depending from the bar 50 and forming means for preventing horizontal rotation of the runner plates may be integral with the bar 50, and these features together with the clamping means for attaching and detaching the saw jointer support to the main tool, are substantially the same as those shown in my pending application No. 375,234 hereinbefore referred to.

In the operation the file A is first placed in its respective positions for jointing and side dressing the cutting teeth of saws. The file being shown in its flatwise position in Figure 1. The saw jointer support is then clamped to the cap plates 18 by the thumb screw 19ᵃ as in Figure 1, and the runner plates 56 adjusted to carry the file at a desired elevation either for maintaining an even curvature of the saw, or for side dressing the saw teeth to even up their set, as may be readily understood by the inspection of Figures 1 and 5. A slight turn of the thumb screw 59 releases the nut 54 to facilitate the adjustment of the runner plates 56, and the thumb screw 59 turned so that it will bear against the adjusting nut 54 for locking the adjustment, so that the saw jointer support may be laid aside and used on saws having the same curvature without changing the adjustment.

In using the swage gauge, it will be understood that when the tool is placed on the saw teeth with the gauge plate 29 out of registry with the two points of a raker tooth and the highest side of the plate catches against the side of the tooth points when sliding the tool lengthwise the saw, it is manifest that the variation in the length of the raker tooth point, with respect to the length of the cutting teeth, is less than the thickness of the washers or shims 28 employed between the cap plates 18 and the series of bosses 16ᵃ and 17, and that a greater variation or reduction in length of the tooth point of 0.002 of an inch is being had for every 1/16 of an inch the tool is moved lengthwise the saw, when the gauge plate and the cap plates contact respectively with the raker and cutter points of the saw without rocking of the tool. The gauge plate 29 may be adjusted in a horizontally transverse position to permit its gaging end to project flush with the outer side of the saw, whereby the point of contact with the tooth points can be determined by the person fitting the saw, in a natural position so that he will not need to stoop to a level of the gauge to view the teeth points.

As a gauge for adjusting the filing gauge members 21 the swaging gauge plate 29 in its present form comes in very handy, for by it the length of a tooth point can always be reliably determined to a fraction of a 0.001 part of an inch, and a tooth point may be fitted to any desired length, whereby the adjustment of the filing gauge members 21 may be made to correspond, by reversing the tool and turning the adjusting screws 25 one direction or another until the tooth point is flush with the filing surface 22 at the point of the tooth stop 24 and testing it with a file. Should it be found that the flexibility of the members 21 is insufficient to permit a full adjustment in the position they are being clamped to the cap plates 18, a slight retraction of the clamping screws 20 will produce the desired effect. Strips of paper may also be inserted between the filing gauge members 21 and the cap plates 18, either in front or behind the clamping screws 20 for adjusting the resiliency of the plate members 21, so that the adjusting screws 25 will at all times draw, or bear, hard against the plate members.

It is to be noted, that in my device of the present construction, the swaging gauge member does not prevent the simultaneous use of both of the filing gauge members 21, so that when a "lead" in a saw is required, as is usually the case, particularly for the felling of large timber, one of the members can be adjusted for fitting the raker points that lead and the other member for fitting the raker points that follow in the outward stroke of the saw, whereby the points that lead from the middle of the saw to its ends, are being left longer than those points that lead from the ends to the middle of the saw.

It is of course understood, that when there is a difference in the adjustment of the filing gauge members, the tool should be reversed, end for end, and placed on opposite sides of the saw from the center thereof. Should it, however, be desired to avoid the necessity of reversing the tool, the gaging surfaces of the members 21 may be adjusted exactly alike and their respective tooth-stops 24 held slightly away from the teeth points that are to be the shortest, when their excessive length which projects above the gaging surfaces is being filed off. It being understood, nevertheless, that the gaging surfaces are being inclined chiefly for the purpose, and at a proper angle, to provide clearance to the raker teeth points, so that they may all be sharpened simultaneously as their length is being gaged.

From the foregoing specification it will readily be understood, that the most accurate and convenient means is provided for vertically adjusting the swaging gauge and the filing gauge members, together with the fully adjustable file bed for the side jointer, and the changes made in the jointer attachment with respect to the adjustment and arrangement of the runner plates, which, taken together will make this a most perfect tool.

I claim:

1. A saw fitting tool including a frame, a jointer support connected to the frame in parallel relation thereabove having heads at its opposite ends, runner plates having threaded stems shiftable through the said heads, an adjusting nut confined in each of the heads between vertically spaced portions thereof and engaging the said stems of the runner plates, and means to secure the stems in adjusted position, said means being carried by the heads and engaging the said adjusting nuts.

2. A saw fitting tool including a frame, a jointer support connected to the frame in parallel relation thereabove having heads at its opposite ends, runner plates having threaded stems shiftable through the said heads, an adjusting nut confined in each of the heads between vertically spaced portions thereof and engaging the said stems of the runner plates, and means to secure the stems in adjusted position, said means consisting of thumb screws threaded through the heads and engageable with the peripheries of the adjusting nuts.

3. A saw fitting tool including a frame having a file bearing face at one side, file clamping means, and file engaging screws threaded therethrough in vertically spaced relation in pairs adjacent to relatively opposite ends of the saw bearing face and adjustable from the opposite side of the tool to control the vertical inclination of a file while the latter is held by the said clamping means.

4. A saw fitting tool having a swaging gauge seat thereon intermediate its ends, a swaging gauge seated on said seat, consisting of a flat plate projecting at one end beyond one side of the frame and provided at said projecting end with a lower swage gaging surface slightly inclined at a predetermined degree of angle as and for the purpose described.

5. A saw fitting tool comprising a frame having an upper swaging gauge seat intermediate its ends, a slotted swaging gauge member on said seat transversely of the tool and projecting therebeyond at one side, a clamping screw through the slot of said member and threaded into the seat, said member and its said seat having coacting means to prevent rotation of the member.

6. A saw fitting tool comprising a frame having an upper swaging gauge seat intermediate its ends, a slotted swaging gauge member on said seat projecting therebeyond at one side, a clamping screw through the slot of said member and threaded into the seat, said member having a depending lug and said seat having a groove into which the lug extends whereby to prevent rotation of the member on its seat.

7. A saw fitting tool including a frame, a swaging gauge member disposed transversely of the upper edge of the frame intermediate its ends, and filing guide members having portions inclined downwardly toward opposite sides of said swaging gauge member and with which the latter cooperates for arriving at a selected predetermined adjustment of the filing guide members, and for guiding the edge of a file at both sides of the swaging gauge member.

8. A saw fitting tool having an upper swaging gauge seat and recesses at opposite sides of said seat, a swaging gauge member secured on the seat, and filing guide members secured at opposite sides of the seat having inner inclined portions adjustably yieldable into the said recesses and coacting with the sides of said swaging gauge member.

9. A saw fitting tool including a frame having upper spaced recesses, filing guide members secured at their outer portions to the frame and having inner inclined portions adjustably yieldable into the said recesses, and means working through the said inclined portions and into the frame, to adjust the former within the recesses.

10. A saw fitting tool including a frame having upper spaced recesses, filing guide members secured at their outer portions to the frame and having inner inclined portions adjustably yieldable into the said recesses, and screw adjusting members extending through said inclined portions and threaded at approximately right angles thereto into the frame.

11. In a saw fitting tool, a transversely outstanding swaging gauge having a lower inclined gaging surface, and provided with rule mark graduations thereabove and along the outer edge thereof, as and for the purpose described.

12. In a saw fitting tool, filing gauge members having depressed graduated guide marks directly on their filing surface around a counter-sunk recess therein, an adjusting screw having a head lying in said recess, provided with a similar mark cooperating with the marks on the filing surface, and denoting the vertical adjusted position of said gauge members, the parts forming a free and unobstructed passage for a file over said graduation marks, as described.

13. In a saw fitting tool, having spaced apart cap plates, filing gauge members adjustably carried by the cap plates and tiltable over the inner end portions of the cap plates as and for the purpose described.

14. In a saw fitting tool including a frame having a pair of laterally projecting cap plates adapted to rest on the cutting teeth points of a saw and mounted on said frame in longitudinally spaced relation to form a gap intermediate their adjacent ends, an adjustably tiltable and yieldable raker teeth filing-gauge member carried by said cap plates, said gauge member having a downwardly inclined file guiding and gaging surface portion projecting from above said cap plate into a recess in the frame within said gap, whereby to simultaneously gauge the length and provide clearance to the raker teeth points of a saw.

15. In a saw fitting tool including a frame having a pair of laterally projecting cap plates adapted to rest on the cutting teeth points of a saw and mounted on said frame in longitudinally spaced relation to form a gap intermediate their adjacent ends, an adjustably tiltable and yieldable raker teeth filing gauge member carried by said cap plates, said gauge member having a downwardly inclined file-guiding and gaging surface portion projecting from above the cap plates into a recess in the frame within said gap, and provided with a raker tooth receiving recess therein, of which transverse edge at the terminal of the recess intersects with the inclined gaging surface at a point approximately in line with, or slightly below the line of the under surface of said cap plates, to form the gaging point of said inclined gaging surface, for engagement with the transverse side edges of the raker teeth points of a saw, and means for varying the vertical adjustment of said gaging surface with relation to the under surface of said cap plates.

16. In a saw fitting tool including a frame having a pair of laterally projecting cap plates adapted to rest on the cutting teeth points of a saw and mounted on said frame in longitudinally spaced relation to form a gap intermediate their adjacent ends, a pair of adjustably tiltable and yieldable raker teeth filing-gauge members carried by the inner ends of said cap plates, said gauge members having each a downwardly and inwardly inclined file guiding and gaging surface portion projecting from above the cap plates into a recess in the frame within said gap, and provided with raker teeth receiving recesses opening inwardly and extending longitudinally outward away from one another to where their transverse edge at the terminals of the recesses intersects with the inclined gaging surface of said members at a point, approximately in line with, or slightly below the line of the under surface of said cap plates, and means for varying the vertical adjustment of said gaging surfaces independently of each other with relation to the under surface of said cap plates.

17. In a saw fitting tool including a frame having a pair of laterally projecting cap plates adapted to rest on the cutting teeth points of a saw and mounted on said frame in longitudinally spaced relation to form a gap intermediate their adjacent ends, a pair of adjustably tiltable and yieldable raker teeth filing gauge members carried by the inner ends of said cap plates, said gauge members having each a downwardly and inwardly inclined file guiding and gaging surface portion projecting from above the cap plates into a recess in the frame within said gap, and provided with recesses therein for reception of the raker teeth of a saw, and screw adjusting members working through the opposite end portions of each filing gauge member into the frame, within the gap and through the cap plates, respectively, for vertically adjusting and clamping in position each of said gauge members independently of each other, with relation to their gaging surfaces and the under surface of said cap plates.

18. A saw fitting tool including a frame having a pair of laterally projecting cap plates adapted to rest on the cutting teeth of a saw and mounted on said frame in longitudinally spaced relation to form a gap intermediate its adjacent ends, said frame having a swaging gauge seat in said gap and a swaging gauge member secured thereto projecting laterally at one side, said member having a lower swage gaging surface slightly inclined at a predetermined degree of angle and provided with rule mark graduations therealong, for denoting the unequal vertical variation between the horizontal line of said cap plates and the subjacent inclined line of said swaging gauge surface opposite each of said graduations, by which to detect, and to selectively determine, corresponding variations in the length of raker teeth with relation to the length of cutting teeth of saws, as described.

GUSTAF ANDERSON.

Witnesses:
LOIS B. GREENE,
E. F. GREENE.